July 17, 1934.                V. E. CARBONARA                1,966,843

TEMPERATURE RESPONSIVE CONTROL MEANS

Filed Dec. 5, 1931          2 Sheets-Sheet 1

INVENTOR
Victor E. Carbonara
BY
Stephen Cerstvik
ATTORNEY

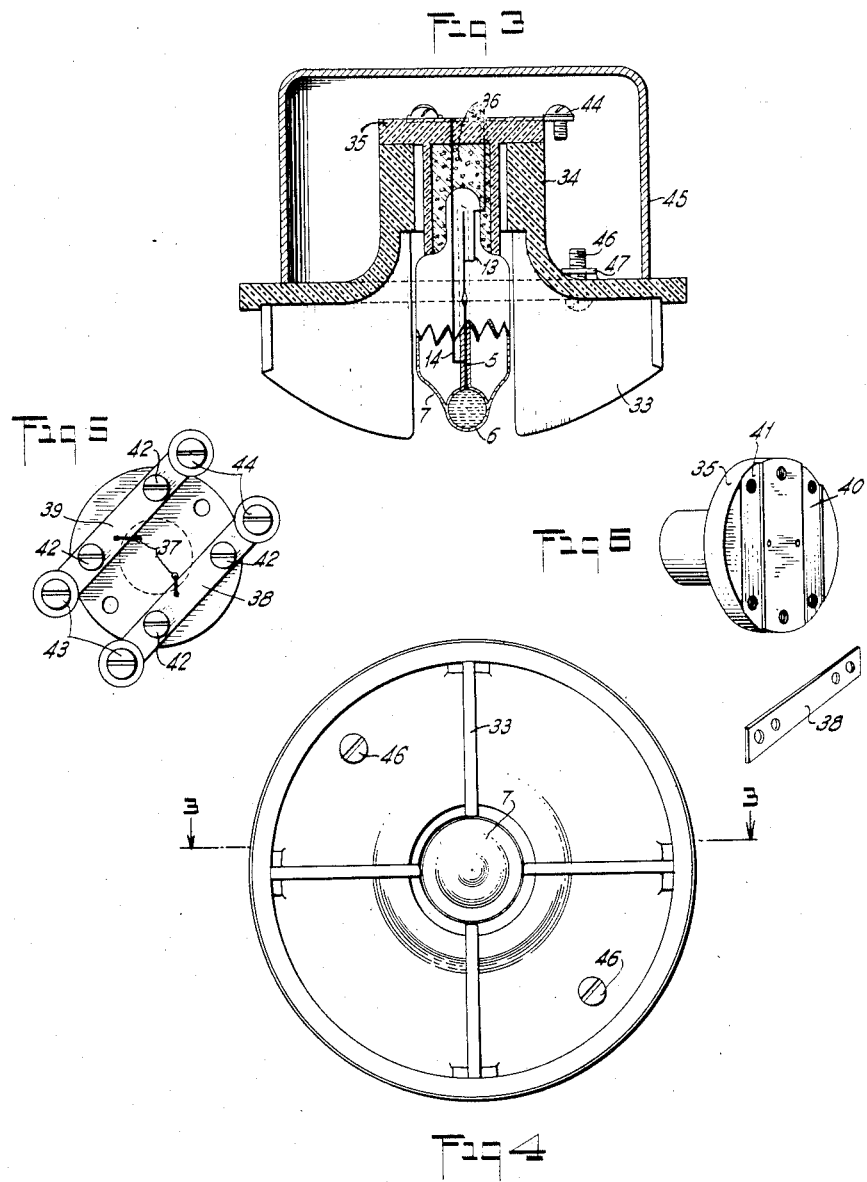

Patented July 17, 1934

1,966,843

UNITED STATES PATENT OFFICE 1,966,843

TEMPERATURE RESPONSIVE CONTROL
MEANS

Victor E. Carbonara, Rockville Center, N. Y., assignor to Bendix Aviation Corporation, South Bend, Ind., a corporation of Delaware Application December 5, 1931, Serial No. 579,333

3 Claims. (Cl. 200—141)

The present invention relates to temperature responsive control means, and more particularly to thermostatic circuit closers of the type which, while susceptible of other uses, are especially adapted for actuating electric fire alarm systems.

The invention embodies a temperature responsive element of the thermometer type for closing an electric circuit when the mercury column rises to a height corresponding to a predetermined temperature at which said electric circuit is to be closed for producing an alarm signal which may be either audible or visual. Broadly, temperature responsive devices of this type have long been known in the art and have been employed with a large measure of success in the operation thereof, but the thermometer element has been susceptible to breakage due to the peculiar construction of the devices, in which the element projected outwardly from its support.

Accordingly, one of the objects of the present invention is to provide a novel temperature responsive control device wherein the thermometer element is protected from breakage and whereby the protecting means serve also as heat-conducting means for rendering the device more sensitive.

Another object of the invention is to provide a novel temperature responsive circuit closer of the mercury type adapted to close a circuit of a bell or other suitable signal whenever the temperature of the surrounding air rises to a predetermined degree.

Another object is to provide a mercury type thermostat of novel construction embodying a transparent envelope for supporting the mercury tube, said envelope being in turn held in supporting means of novel construction.

A further object is to provide novel supporting means integral with a thermostat of the foregoing type and adapted to protect the device against entrance of air, moisture, or other foreign substances which would impair the efficiency and reliability of the device.

A still further object is to provide novel mounting means for a device of the foregoing character, which mounting means facilitate the installation or removal of the device as well as enhancing its accessibility and adaptability.

Another object is to provide novel mounting means of the above type which may also serve as the current-feeding means.

Another object of the invention is to provide in a device of the class described, a novel construction embodying combined protecting and heat-conducting means for the mercury containing portion of the device.

Still another object is to provide a novel method of manufacturing a thermostat of the mercury type whereby the device is so constructed as to terminate in a lamp-base of the character commonly employed in incandescent electric lamps.

The above and other objects and advantages of the invention will appear more fully hereinafter from a consideration of the detailed description which follows, taken together with the accompanying drawings, wherein two embodiments of the invention are illustrated. It is to be expressly understood, however, that the drawings are for the purpose of illustration and description only, and are not designed as a definition of the limits of the invention, reference being had for this purpose to the appended claims.

In the drawings, wherein like reference characters refer to like parts throughout the several views, Fig. 1 is an elevational view, partly in section, of one form of device embodying the present invention;

Fig. 3 is an elevation, partly in section, of another form of device embodying the invention;

Fig. 4 is a plan view similar to that shown in Fig. 2;

Fig. 5 is a detail plan view, looking downward in Fig. 3 on the base of the device; and Fig. 6 is a perspective view of the base shown in Fig. 4.

Figure 1:
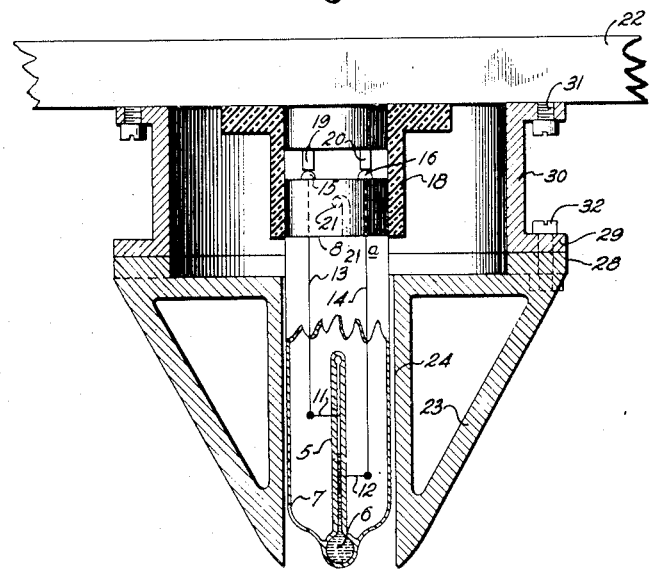
Figure 2:
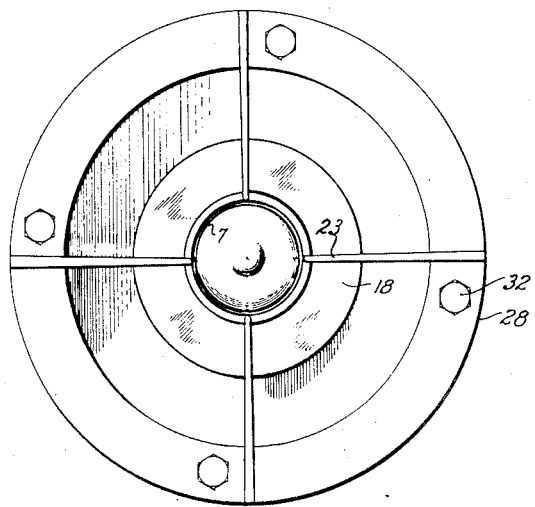
Fig. 2 is a plan view, looking upward, of the device shown in Fig. 1.

Referring to the drawings, and more particularly to Figs. 1 and 2, it will be seen that, in the form shown therein, the invention is embodied in a device including a vessel or capillary tube 5 of the thermometer type, preferably of glass and containing a quantity of mercury or other substance having the desired qualities, the tube 5 terminating in a mercury-containing bulb 6 to which is fused or otherwise integrally formed an envelope 7 of glass or other suitable transparent material. The upper end of the envelope 7 is cemented or suitably molded into a metallic base 8 in a manner similar to that employed in the manufacture of incandenscent electric lamps. The air in the envelope 7 may be evacuated in the usual manner for the purpose of preventing the temperature responsive device from becoming inoperative in the event any leaks should occur around the terminals or electrodes extending into the capillary tube 5 which provides contact with the mercury in a manner and for a purpose to be described hereinafter.

In addition to providing the novel combined thermometer tube and envelope and the novel securing means just described, the invention further contemplates, as suggested above, the provision of a novel current-conducting means for operating an annunciator or alarm-sounding apparatus with which the device is adapted to be employed, on a predetermined rise of temperature. In the present embodiment, such means preferably include a pair of electrodes 11 and 12 suitably secured within the wall of the tube 5 at properly spaced points, as shown, depending upon the temperature at which it is desired to close the electric circuit, said two electrodes having extensions or leads 13 and 14 which are fused to the upper end of the envelope 7 and connected to terminals 15 and 16 extending from the metal base 8. Terminals 15 and 16a are fixed in suitable insulating material (not shown) provided in the base, and arranged in position to register, upon insertion of the device in an insulating socket 18, with associated terminals 19 and 20, respectively. The latter terminals may have connected thereto suitable conductors leading to a bell or other signal producing element of the system, the particular form of which is immaterial to the present invention.

Any suitable means may be employed for providing a locking but readily detachable connection between the base 8 of the thermostat device and the socket 18, but it is preferable to employ a lock of the bayonet type, as indicated in Fig. 1, and comprising a pin 21 on the base 8 cooperating with a slot 21a in the socket 18. Likewise, any suitable means may be employed for securing the socket 18 to the sealing or other support 22.

Novel means are provided for protecting the breakable portion of the device, namely, the glass envelope 7 and the thermometer tube 5, which means also afford efficient heat-conductance for insuring proper response to the thermometer to the surrounding air, and in the form shown comprise a plurality of thin downwardly extending and radially disposed protective members or fins 23 which may be triangularly shaped as shown in Fig. 1, and are mounted so as to present their inner edges, as indicated at 24, adjacent the wall of the evacuated envelope 7 in order to protect said envelope and the thermometer tube 5 without interfering with radiation of heat to the mercury in the bulb 6.

In the present embodiment suitable supporting means are provided for the guard members 23 which, as shown, take the form of a circular flange 28 integral therewith and adapted to register with a similar cooperating flange 29 on a cylindrical base 30 secured to the support 22 in any suitable manner, as by means of screws 31 and the flanges 28 and 29 being likewise secured together by means of screws 32.

Referring to Fig. 3, there is shown another form of device embodying the present invention, in which the guard members or protecting fins 33 are of somewhat different form from those shown in Fig. 1 and are formed integral with an extension 34 forming a support for the socket member 35. In this embodiment the evacuated vessel 7 is secured permanently in the socket member 35 in any suitable manner, as by means of an adhesive mass 36 such as porcelain cement. The lead wires 13 and 14 are brought out from the socket 35 through openings 37 and connected in any suitable manner, as by soldering, to metallic strips 38 and 39, and placed in grooves 40 and 41 formed in the socket member 35 and secured to the latter in any suitable manner, as by means of screws 42. The metallic connections 38 and 39 are provided with terminal or binding posts 43 and 44 for connecting the thermostat to any suitable signal alarm circuit. The screws 42 also serve to secure the socket member 35 to the extension 34. The entire assembly may be mounted in a casing or cover 45 and secured to the latter by means of screws 46 engaging with lugs 47 formed integral with the cover 45.

It will be seen, in both embodiments, that when the mercury rises in capillary tube 5 due to a rise in temperature the gap between the electrodes 11 and 12 will be closed, thereby closing the electric circuit to the alarm device.

From the foregoing it is apparent that the invention provides a temperature responsive circuit closer of novel construction which is relatively simple and may be easily installed, and one which is not subject to the deteriorating influence of moisture or air, or easily broken. Heretofore, efforts have been made to seal thermostats of this character against the admission of air or moisture, by the use of sealing liquids, sealing wax, and similar substances, but these are obviously of uncertain efficiency as compared with the method used in the manufacture of incandescent lamps, the application of which method to a device of the character herein disclosed constitutes one of the novel features of the present invention.

Although only two embodiments of the invention have been illustrated and described, other changes and modifications, which will now appear to those skilled in the art, may be made in the construction and method of assembly and operation of the parts of the device herein disclosed without departing from the scope of the invention, and certain features of the invention may be utilized independently of others, as for example, the guard may be varied in shape and form and an inert gas such as neon introduced into the vessel to produce a luminous effect whereby the device may serve as an indicator as well as a thermostat. Reference is therefore to be had to the appended claims for a definition of the limits of the invention.

What is claimed is:

1. In a device of the class described, a tube having mercury therein; a pair of conducting leads secured in the wall of said tube in a position to contact with the mercury upon its rising to a sufficient height therein; closure means for said tube and said leads comprising a second tube surrounding said first named tube and merging therewith at its lower end; and means at the upper end of said second named tube for securing said leads in insulated relation to each other, said second tube being evacuated and sealed against the entry of air or moisture to prevent the inoperation of the mercury within the first tube in the event leaks occur in said first tube around the conducting leads.

2. In a device of the class described, a tube having a bulb at one end thereof filled with mercury; a pair of conducting leads secured in the wall of said tube in a position to contact with the mercury upon its rising to a sufficient height therein; closure means for said tube and said leads comprising a second tube surrounding said first named tube and merging therewith at its bulb end; means at the upper end of said second named tube for fusing said leads in insulated relation to each other and completely sealing said tube against the entry of air, the space formed between the first and second tubes being evacuated to prevent inoperation of the mercury within the first tube in the event leaks occur in said first tube around the conducting leads; and means enclosing said last mentioned means and having guard means thereon in the form of fins extending radially from the common axis of the two tubes to prevent breaking of said tubes and to afford efficient heat transmission to the device from the surrounding air.

3. A device of the class described comprising a tube having a heat responsive fluid therein; a second tube surrounding said first named tube and merging at one end therewith; a base of insulating material secured to the other end of said surrounding tube; a pair of current conducting leads secured in the wall of the said first named tube and terminating in contacts firmly held in said base, said heat responsive fluid being adapted to close an electric circuit through said leads, the space formed between the first and second tubes being evacuated to prevent the inoperation of the mercury within the first tube in the event leaks occur in said first tube around the conducting leads; and external protecting means for both said tubes comprising a plurality of fins extending downwardly from the base and disposed radially with their inner edges adjacent the second tube so that they afford efficient heat transmission from the surrounding air to the device while protecting the same.

VICTOR E. CARBONARA.